United States Patent
Niepelt

(10) Patent No.: US 6,790,516 B2
(45) Date of Patent: Sep. 14, 2004

(54) MULTI-LAYER LABEL FILM

(75) Inventor: Ralf Niepelt, Gronau (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 55 days.

(21) Appl. No.: 10/255,197

(22) Filed: Sep. 26, 2002

(65) Prior Publication Data

US 2003/0077472 A1 Apr. 24, 2003

(30) Foreign Application Priority Data

Sep. 27, 2001 (DE) .......................................... 101 47 836

(51) Int. Cl.⁷ .............................. B32B 7/02; B32B 27/32
(52) U.S. Cl. ..................... 428/216; 428/41.3; 428/41.8; 428/213; 428/215; 428/352; 428/354; 428/451; 428/512; 428/513; 428/516
(58) Field of Search .................. 428/41.3, 41.8, 428/213, 215, 216, 352, 354, 451, 512, 513, 516, 40.1

(56) References Cited

U.S. PATENT DOCUMENTS 5,455,092 A * 10/1995 Tung .......................... 428/41.3

FOREIGN PATENT DOCUMENTS

| DE | 38 78 641 | 9/1993 |
|---|---|---|
| DE | 691 28 318 | 6/1998 |
| EP | 0 335 425 | 4/1989 |
| WO | WO 93/03695 | 3/1993 |

* cited by examiner

Primary Examiner—D. S. Nakarani
(74) Attorney, Agent, or Firm—Collard & Roe, P.C.

(57) ABSTRACT

A multi-layer co-extruded label film has layers that are connected with one another. It has a printable first layer (11+12) that has a thickness of 60–80 µm and consists of 60-80 wt.-% LDPE and 40–20 wt.-% HDPE, a second layer (2) that has a thickness of 10–20 µm and consists of 100 wt.-% LDPE, an adhesive layer (3) that is arranged on the HDPE-free side of the second layer (2), as well as a carrier material made of paper or polymer film.

10 Claims, 1 Drawing Sheet

MULTI-LAYER LABEL FILM

BACKGROUND OF THE INVENTION

1. Field of the Invention

The present invention relates to a multi-layer label film that comprises layers that are connected with one another.

2. The Prior Art

At present, label films are predominantly produced from medium-density polyethylene (MDPE), i.e. with a density of 0.930–0.935 g/cm³. These films are usually offered on the market starting from a minimum thickness of 95 µm. The films are characterized by good rigidity and very good behavior during punching. Further reductions in thickness, in the case of this raw material, result in drastic losses in rigidity, which is important for the ability to dispense the labels at the processing facility. For this reason, high-density polyethylene (HDPE), with a density of 0.955–0.965 g/cm³, is used for films that are thinner than 90 µm, in order to balance out the loss in rigidity. The disadvantage of these label films, which can contain 20–50 wt.-% HDPE, depending on the thickness, is that with an increasing HDPE content, the behavior during punching clearly deteriorates. Both film types are usually produced as single-layer or symmetrically structured multi-layer films, in order to counteract a tendency of the label to roll up.

A multi-layer fabric material is known from EP-B-0335 425, which comprises layers connected with one another. This is a co-extrudate made of a relatively thick core layer made of a polymer film material and a relatively thin surface layer made of polymer film material on the top of the co-extrudate. The material has a surface that can be printed on with printing ink, and a layer of a pressure-sensitive adhesive that is arranged on the side of the extrudate that faces away from the top. The material is used for the production of labels. In this known material, the core layer consists of low-density, medium-density, or high-density polyethylene, while the thin surface layer can consist of ethylene vinyl acetate, polyvinyl chloride, or other polymers, with the exception of polyethylene. In each case, the core layer and the thin surface layer are therefore produced from different materials. This results in a material mix, which is a disadvantage with regard to production, and particularly with regard to disposal of the material.

SUMMARY OF THE INVENTION

It is an object of the present invention to provide a label film that avoids the disadvantages of the prior art as described. The label film according to the invention has the advantages that it has no tendency to roll up, and is easy to punch.

The above objects are accomplished with a multi-layer label film of the type stated initially that has the layer sequence as follows. In this connection, LDPE=low-density polyethylene is defined as follows: low-density PE; density between 0.928 and 0.935 g/cm³.

A printable first layer that has a thickness of 60–80 µm and consists of 60–80 wt.-% LDPE and 40–20 wt.-% HDPE, a second layer that has a thickness of 10–20 µm and consists of 100 wt.-% LDPE, and an adhesive layer that is arranged on the HDPE-free side of the second layer, as well as a carrier material. The HDPE-free side of the second layer is that side not in contact with the first layer. The printable first layer and the second layer are formed by co-extrusion.

It is advantageous if the first layer of the label film is in turn made up of at least two layers; in the case of two layers, the layer arranged on the outside can have a thickness of 10–30 µm and consist of 70–90 wt.-% LDPE and 10–30 wt.-% HDPE, and the additional layer can have a thickness of 40–50 µm and consist of 50–69 wt.-% LDPE and 31–50 wt.-% HDPE.

This film is therefore characterized in that an outside layer is produced from conventional LDPE. This layer represents the back of the finished label, which is coated with a pressure-sensitive adhesive. The other two layers contain HDPE. During rotation punching or flat-bed punching of the finished label laminate, which consists of the label coated with adhesive and here is laminated against silicone paper as the release, the punching resistance is clearly reduced by the HDPE-free LDPE layer that lies towards the silicone paper. During punching, only the label is to be punched through, not the silicone paper.

Therefore the blades of the punching die are adjusted in such a way that they just punch through the label, but only make a slight partial punch in the paper, without damaging it. The greatest punching force is applied when breaking through the surface of the label, which contains LDPE. The less strong LDPE layer reduces the punching force when the punching blades exit from it. In practical situations, it sometimes occurs that the labels are not completely punched out. Because the LDPE layer is less strong, the labels can nevertheless be more easily processed, because the LDPE tears more easily, because of its lower tear propagation resistance, than the LDPE layer that contains HDPE.

It is preferable if the LDPE used for production of the labels has a density of 0.928–0.935 g/cm³, and if the HDPE has a density of 0.955–0.965 g/cm³.

It is preferable if the layer thickness ratio of the layers is (11):(12):(2)=1–4:2–5:1.

In a particularly preferred embodiment of the label film according to the invention, the layer thickness ratio is (11):(12):(2)=1.7:3:1.

It is advantageous if silicone coated paper is used as the carrier material. Other release films are also possible, such as those with polyolefins as the carrier film, for example polybutylene or polypropylene as the polyolefin.

BRIEF DESCRIPTION OF THE DRAWING

The FIGURE of the drawing shows a cross-section through a multi-layer label film according to the invention.

DETAILED DESCRIPTION OF PREFERRED EMBODIMENTS

Figure 1:
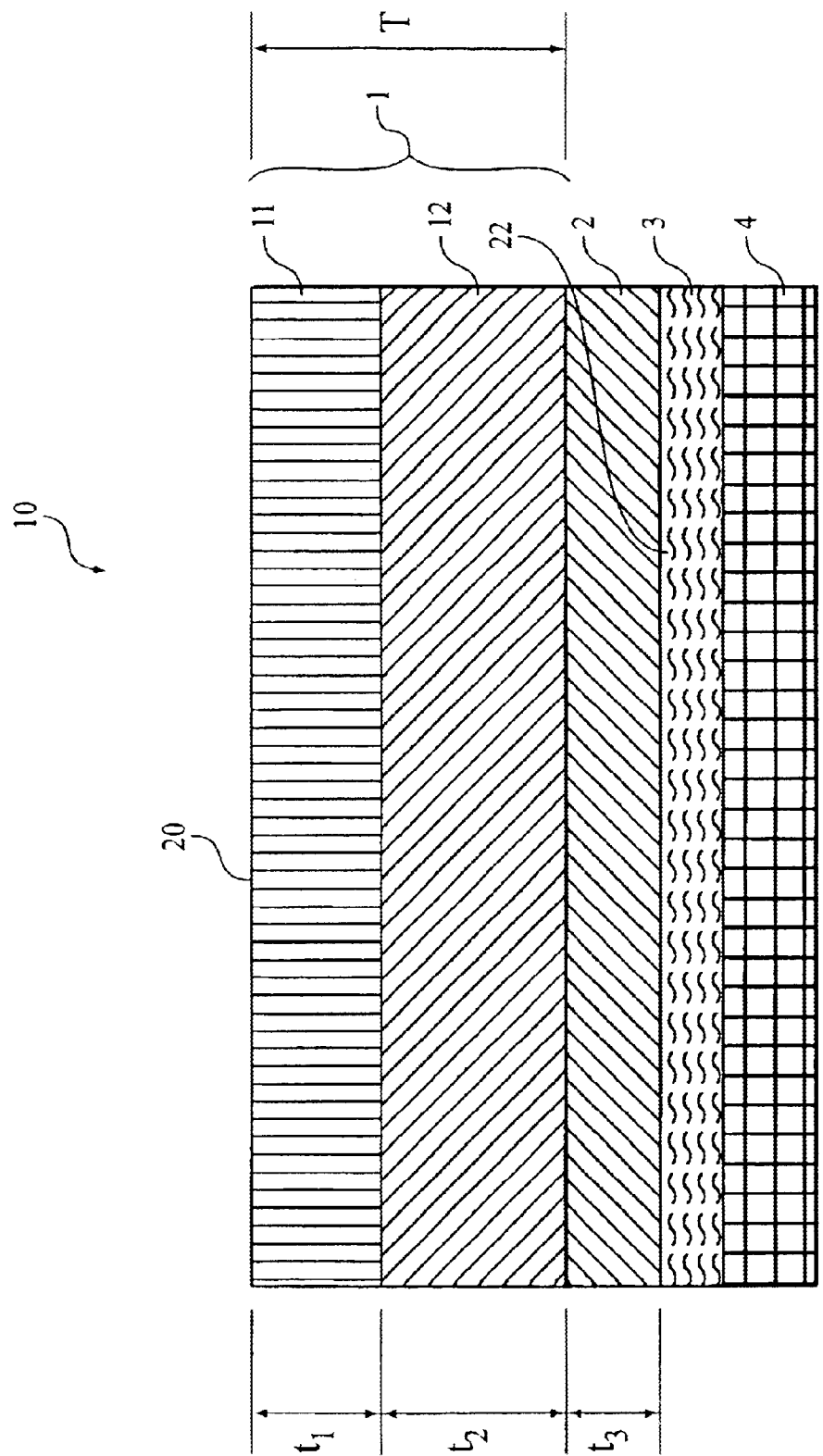

In the following, the invention will be explained in greater detail using the drawing and using exemplary embodiments.

In this film 10, the first layer 1 is made up of two layers, with the layer 11 arranged on the outside 20 of the film 10 having a thickness $t_1$ of 25 µm and consisting of 80 wt.-% LDPE and 20 wt.-% HDPE. The layer 12 is 45 µm in thickness $t_2$ and consists of 60 wt.-% LDPE and 40 wt.-% HDPE. The layer 2 is 15 µm in thickness $t_3$ and consists of 100% LDPE. The layers 1 and 2 are formed together by co-extrusion. On the HDPE-free side 22 of the layer 2, an adhesive layer 3 is arranged, which is connected with a carrier material 4. The HDPE free side 22 of layer 2 is the side not in contact with the layer 12 or the first layer 1. The first layer 1 has a total thickness T.

COMPARISON EXAMPLE 1

A single-layer label film made from a mixture of 70 wt.-% LDPE and 30 wt.-% HDPE with a total layer thickness of 85 µm was produced. The film proved to be difficult to punch.

COMPARISON EXAMPLE 2

A label film with a symmetrical layer sequence was produced, with a layer consisting of 80 wt.-% LDPE and 20 wt.-% HDPE, and with a layer thickness of 28 μm. The second layer is 29 μm thick and consists of 60 wt.-% LDPE and 40 wt.-% HDPE. Layer 3 corresponds to layer 1, i.e. it is also 28 μm thick and consists of 80 wt.-% LDPE and 20 wt.-% HDPE. This film is easier to punch than the material according to Comparison Example 1. Nevertheless, the punchability is not satisfactory; the material must still be assessed as difficult to punch.

COMPARISON EXAMPLE 3

A label film with asymmetrical layers was produced, with a first layer consisting of 100% LDPE, at a layer thickness of 15 μm. Layer 2 is 45 μm thick and consists of 60 wt.-% LDPE and 40 wt.-% HDPE. The third layer is 25 μm thick and consists of 80 wt.-% LDPE and 20 wt.-% HDPE. This film, again, is easier to punch than the material according to Comparison Example 1. However, it continues to demonstrate poor punchability overall, corresponding to that of Comparison Example 2.

EXAMPLE 1 (ACCORDING TO THE INVENTION)

An asymmetrical label film was produced, with a first layer having a layer thickness of 70 μm and consisting of 70 wt.-% LDPE and 30 wt.-% HDPE. The second layer is 15 μm thick and consists of 100 wt.-% LDPE. This film demonstrates good punchability and does not demonstrate any tendency to roll up.

EXAMPLE 2 (ACCORDING TO THE INVENTION)

An asymmetrical label film was produced with a first layer having a total layer thickness of 70 μm and a second layer. The second layer is 15 μm thick and consist of 100 wt.-% LDPE. The first layer is made up of two layers of which a layer arranged on the outside of the film has a thickness of 25 μm and consists of 80 wt.-% LDPE and 20 wt.-% HDPE. The other layer consists of 60 wt.-% LDPE and 40 wt.-% HDPE and is 45 μm thick. The punchability of this film is significantly better than the punchability of the label films described in the comparison examples. The film does not demonstrate any tendency to roll up.

Accordingly, while a few embodiments of the present invention have been shown and described, it is to be understood that many changes and modifications may be made thereunto without departing from the spirit and scope of the invention as defined in the appended claims.

What is claimed is:

1. Multi-layer label film having layers that are connected with one another, comprising
   a printable first layer (1) that has a thickness of 60–80 μm and consists of 60–80 wt.-% LDPE and 40–20 wt.-% HDPE;
   a second layer (2) that has a thickness of 10–20 μm and consists of 100 wt.-% LDPE; said second layer having an HDPE-free side not contacting the first layer;
   a pressure sensitive adhesive layer (3) that is arranged on the HDPE-free side of the second layer (2); and
   a carrier material (4) arranged on the adhesive layer; wherein the first layer (1) and the second layer (2) are formed by co-extrusion.

2. Label film according to claim 1, comprising
   the first layer (1) of the label film is in turn made up of at least two layers, of which a layer (11) arranged on an outside of the film has a thickness of 10–30 μm and consists of 70–90 wt. % LDPE and 10–30 wt.-% HDPE; and
   another layer or layers (12) arranged between the layer (11) and the layer (2) have a total thickness of 40–50 μm and consist of 50–69 wt.-% LDPE and 31–50 wt.-% HDPE.

3. Label film according to claim 2, wherein the layer thickness ratio of the layers is (11):(12):(2)=1–4:2–5:1.

4. Label film according to claim 3, wherein the layer thickness ratio is (11):(12):(2)=1.7:3:1.

5. Label film according to claim 1, wherein the LDPE has a density of 0.928–0.935 g/cm³.

6. Label film according to claim 1, wherein the HDPE has a density of 0.955–0.965 g/cm³.

7. Label film according to claim 1, wherein the carrier material (4) comprises silicone coated paper.

8. Label film according to claim 1 wherein the carrier material is a polyolefin.

9. Label film according to claim 8, wherein the polyolefin is polypropylene.

10. Label film according to claim 8, wherein the polyolefin is polybutylene.

* * * * *